United States Patent [19]

Nezu et al.

[11] 4,355,053

[45] Oct. 19, 1982

[54] METHOD FOR IMPROVING THE ADHESIVENESS OF THE SURFACE OF A SYNTHETIC POLYMERIC SUBSTRATE TO COATINGS

[75] Inventors: Tuguo Nezu; Masuo Tsuchiya; Masahiro Sakamoto; Hiroyuki Nakayama, all of Hiratsuka; Shigeo Tazuke, Yokohama, all of Japan

[73] Assignee: Kansai Paint Co., Ltd., Hyogo, Japan

[21] Appl. No.: 240,365

[22] Filed: Mar. 4, 1981

[30] Foreign Application Priority Data

Mar. 10, 1980 [JP] Japan .................................. 55-29231

[51] Int. Cl.³ .............................................. B05D 3/06
[52] U.S. Cl. .............................. 427/54.1; 204/159.15; 204/159.16; 427/53.1
[58] Field of Search ...................... 427/40, 54.1, 53.1; 204/159.15, 159.16

[56] References Cited

U.S. PATENT DOCUMENTS

| | | | |
|---|---|---|---|
| 3,488,215 | 1/1970 | Shepherd et al. | 428/441 |
| 3,635,756 | 1/1972 | Shepherd et al. | |
| 3,892,575 | 7/1975 | Watts et al. | 430/533 |
| 4,098,953 | 7/1978 | Wright et al. | 427/40 |
| 4,275,092 | 6/1981 | Nakayama et al. | 430/296 |

*Primary Examiner*—John H. Newsome
*Attorney, Agent, or Firm*—Wenderoth, Lind & Ponack

[57] ABSTRACT

A method for improving the adhesiveness of the surface of a synthetic polymeric substrate to coatings, which comprises coating the surface of the synthetic polymeric substrate with a photopolymerizable composition comprising (A) a hydrophilic resin obtained by the polymerization of a polymerizable unsaturated monomer composition containing at least 10% by weight of a hydrophilic unsaturated monomer, (B) a radical-polymerizable mono-unsaturated monomer and (C) a triplet state sensitizer having a triplet state energy of at least 50 Kcal/mole, and then irradiating actinic rays to the coated surface of the polymeric substrate.

5 Claims, No Drawings

METHOD FOR IMPROVING THE ADHESIVENESS OF THE SURFACE OF A SYNTHETIC POLYMERIC SUBSTRATE TO COATINGS

This invention relates to a method for modifying the surface of a synthetic polymeric substrate. More specifically, it relates to a method for improving the adhesiveness of the surface of a non-polar polyolefinic substrate by forming a layer having good adhesion to paints, adhesives, etc. on the surface.

With the recent development of the polymer chemical industry, numerous polymeric substrates have found extensive use in a broad range of fields such as household goods, building materials, industrial goods, vehicles, etc. In particular, polyolefinic resins have been used in considerable quantities in packaging materials, sundry goods, etc. because of their low cost and ease of molding, and now also find applications as automotive parts and structural materials in order to reduce vehicle weight.

In these uses, it is generally considered desirable to coat the surface of a polyolefinic substrate with a paint thereby protecting it and imparting esthetic characteristics thereto, or to use it in the form of a composite material by bonding another substrate to its surface with an adhesive. Since the polyolefinic resins are intrinsically non-polar, they have excellent water resistance and solvent resistance, but suffer from the detect of having poor adhesion to other materials such as paints, adhesives, etc., which limits their uses.

In an attempt to remove this defect, a method was previously proposed which comprises contacting a photopolymerizable composition containing a radical-polymerizable compound with the surface of a synthetic polymeric substrate and grafting the radical-polymerizable compound to the substrate surface under irradiation of actinic rays thereby improving the adhesiveness of the substrate surface to a paint (Japanese Laid-Open Patent Publication No. 74973/1979).

The surface treated by the above method shows excellent adhesion to a broad range of paints. But when it is desired to obtain a coated film having durability over an extended period of time, it is essential to remove the unreacted photopolymerizable composition and the non-grafted polymer of the radical-polymerizable compound remaining on the surface of the polymeric substrate after the photo-grafting reaction of the radical-polymerizable compound. Accordingly, this prior method results in reduced operability and productivity, and also the cost of production is high.

There was also proposed a method for improving the adhesion of a polyolefinic resin which comprises coating it with a known ultraviolet-curable composition containing unsaturated resins such as an unsaturated polyester, an unsaturated epoxy resin, an unsaturated acrylic resin, an unsaturated urethane resin, etc. and exposing the coated resin to ultraviolet light to form a cured film (Japanese Laid-Open Patent Publication No. 128067/1979). It is theorized in this patent document that a part of the ultraviolet light passes through the ultraviolet-curable composition and arrives at the surface of the polyolefinic resin to generate radicals on its surface, and the radicals form a chemical bond with the aforesaid unsaturated resin on the bonded surface thereby increasing the adhesion strength of the polyolefin surface.

However, since the wavelength of actinic light used in this prior method is usually at least 240 nm and its energy is 120 Kcal/mole at the highest, we assume that the curing reaction of the ultraviolet-curable composition takes place predominantly over the chemical bonding reaction on the surface of the polyolefinic resin. This is presumably the reason why a bonded surface having practical durability cannot be obtained by the method described in Japanese Laid-Open Patent Publication No. 128067/1979 although the method is slightly better than a conventional method involving coating a primer on a polyolefinic resin.

It is an object of this invention therefore to provide a method for easily forming an adhesive film layer capable of permitting adhesion with excellent durability on the surface of a synthetic polymeric substrate.

The above object of the invention is achieved by a method for forming an adhesive layer on the surface of a synthetic polymeric substrate, which comprises coating the surface of the synthetic polymeric substrate with a photopolymerizable composition comprising (A) a hydrophilic resin resulting from the polymerization of a polymerizable unsaturated monomer composition containing at least 10% by weight of a hydrophilic unsaturated monomer, (B) a radical-polymerizable mono-unsaturated monomer and (C) a triplet state sensitizer having triplet state energy of at least 50 Kcal/mole, and then irradiating actinic rays to the coated surface of the polymeric substrate.

According to the method of this invention, the triplet state sensitizer (C) used induces a hydrogen extracting reaction on the surface of the polymeric substrate to form many active sites for grafting reaction, and the hydrophilic resin (A) orients the radical-polymerizable mono-unsaturated monomer (B) on the surface of the substrate, thereby increasing the rate of grafting reaction and at the same time decreasing the oxygen concentration on the surface of the substrate to prevent oxygen from hampering the grafting reaction. As a result, the grafting reaction of the radical-polymerizable mono-unsaturated monomer (B) occurs effectively on the surface of the substrate. Furthermore, since the hydrophilic resin (A) simultaneously forms a cured film having excellent durability, an adhesive surface having durability over an extended period of time can be formed without resorting to removing the unreacted photopolymerizable compositions, etc. as in the prior art method.

The synthetic polymeric material to which the method of this invention is applied may be any known synthetic resins which contain easily extractable hydrogen in the main chain or side chains of polymer. Since no method for effectively modifying the surface of a polyolefinic resin has been developed heretofore, the method of this invention is particularly effective in treating polyolefinic resins.

The polyolefinic resins include homopolymers of olefins, copolymers of at least two olefins, and copolymers of at least one olefin with at least one other copolymerizable vinyl monomer. The olefins mentioned above include not only olefins having only one ethylenic double bond (monolefins) but also those having at least two ethylenic double bonds (diolefins, etc.). Specific examples are ethylene, propylene, butene, isobutylene, pentene, cyclobutene, cyclohexene, butadiene, and isoprene.

Examples of the other vinyl monomer copolymerizable with the olefins include aromatic vinyl compounds such as styrene, α-methylstyrene and vinyltoluene; vinyl esters of organic acids such as vinyl acetate and vinyl propionate; unsaturated carboxylic acids and the anhydrides or esters thereof, such as acrylic acid, methacrylic acid, methyl acrylate, ethyl acrylate, propyl acrylate, n-butyl acrylate, isobutyl acrylate, 2-ethylhexyl acrylate, methyl methacrylate, ethyl methacrylate, n-propyl methacrylate, isopropyl methacrylate, n-butyl methacrylate, 2-ethylhexyl methacrylate, maleic acid and maleic anhydride; and allyl vinyl ether, vinyl chloride and vinylidene chloride.

Further examples of the synthetic polymeric materials include epoxy resins, urethane resins, polyamide resins and cellulose resins. p The "hydrophilic resin" used as component (A) of the photopolymerizable composition in this invention is prepared from an unsaturated monomeric composition containing at least 10% by weight of a hydrophilic ethylenically unsaturated monomer. The hydrophilic ethylenically unsaturated monomer includes those which dissolve in water to an extent of at least 1% by weight at room temperature. Specific examples of such hydrophilic monomer are given below.

(i) α,β-Ethylenically unsaturated acids;
Acrylic acid, methacrylic acid, maleic acid, maleic anhydride, etc.

(ii) Acrylic or methacrylic amides or N-substituted amides:
Acrylamide, methacrylamide, N-dimethylacrylamide, N-dimethylmethacrylamide, N-methylolacrylamide, N-methylolmethacrylamide, diacetoneacrylamide, acrylomorpholine, methylacrylomorpholine, etc.

(iii) Acrylic or methacrylic acid esters:
Alkyl ($C_1$–$C_2$) esters of acrylic or methacrylic acid such as methyl acrylate, ethyl acrylate, methyl methacrylate and ethyl methacrylate; hydroxyalkyl esters of acrylic or methacrylic acid, such as 2-hydroxyethyl acrylate and 2-hydroxyethyl methacrylate; aminoalkyl esters of acrylic or methacrylic acid, such as 2-dimethylaminoethyl acrylate and 2-dimethylaminoethyl methacrylate; and sulfonic acid group- or phosphoric acid group-containing alkyl esters of acrylic or methacrylic acid, such as 2-sulfoethyl acrylate, 2-sulfoethyl methacrylate, 2-phosphoric ethyl acrylate, 2-phosphoric ethyl methacrylate, 2-phosphoric-1-chloromethylethyl acrylate and 2-phosphoric-1-chloromethylethyl methacrylate.

(iv) N-vinyl compounds
such as N-vinyl substituted nitrogen-containing heterocyclic compounds:
N-vinylimidazole, N-vinylpyrrolidone, N-vinylcaprolactam, etc.

The hydrophilic ethylenically unsaturated monomer is properly selected according to the desired properties of the resulting hydrophilic resin. It may be used in the form of a homopolymer or a copolymer of at least two of such monomers. Further, a copolymer obtained by copolymerizing the aforesaid hydrophilic ethylenically unsaturated monomer with not more than 90% by weight, preferably not more than 75% by weight, based on the total amount of the monomers, of a non-hydrophilic ethylenically unsaturated monomer can also be used as the hydrophilic resin.

Examples of such a non-hydrophilic ethylenically unsaturated monomer are styrene, acrylonitrile, $C_{1-12}$ alkyl or glycidyl esters of acrylic or methacrylic acid, and vinyl esters of aliphatic or aromatic monobasic acids, such as vinyl acetate.

Polymerization of the monomeric composition is carried out by known methods, such as solution-polymerization, emulsion-polymerization or suspension-polymerization techniques. Generally, it is carried out by the solution-polymerization method which comprises reacting the aforesaid monomer in a suitable inert solvent in the presence of a polymerization catalyst at about 0° to 180° C. for about 0.5 to 20 hours.

It has not been elucidated what action the resulting hydrophilic resin (A) exerts in the photopolymerizable composition. It is presumed however that the hydrophilic resin (A) interacts with the radical-polymerizable mono-unsaturated monomer to localize the radical-polymerizable mono-unsaturated monomer to the surface of the synthetic polymeric substrate, thereby increasing the concentration of the unsaturated monomer on the surface of the substrate and enhancing its graft-reactivity; in other words, the hydrophilic resin (A) acts in the composition as if it were a polymeric surfactant. It is also believed that in addition to the above action, the hydrophilic resin increases the viscosity of the photopolymerizable composition near the surface of the polymeric substrate, thereby preventing diffusion of oxygen and thus preventing hampering of the grafting reaction by oxygen. Furthermore, since the interaction between the hydrophilic resin (A) and the radical-polymerizable mono-unsaturated monomer (B) promotes crosslinking of the component (A) itself, it consequently also promotes the curing of the photopolymerizable composition.

The hydrophilic resin (A) having the above actions have a number average molecular weight of about 2,000 to about 1,000,000, preferably about 5,000 to about 200,000. If the number average molecular weight is less than 2,000, the hydrophilic resin (A) cannot act as a polymeric surfactant, and if it exceeds 1,000,000, the viscosity of the photopolymerizable composition becomes excessively high reducing its coatability.

The proportion of the hydrophilic resin (A) in the photopolymerizable composition is desirably in the range of 0.1 to 55%, preferably in the range of 1 to 30% by weight, per 100% of the components (A), (B) and (C) combined. If the content of the component (A) is less than 0.1% by weight, the hydrophilic resin (A) cannot perform the actions described hereinabove, and the efficiency of the grafting reaction is poor. Moreover, the curing of the photopolymerizable composition is insufficient, so that the object of this invention cannot be achieved. On the other hand, if the content of the component (A) exceeds 55% by weight, the surface-activating action of the hydrophilic resin (A) is reduced and the efficiency of the grafting reaction is decreased. At the same time, the coatability of the composition is reduced.

If desired, a radical-polymerizable unsaturated group may be introduced into the hydrophilic resin (A). This renders the hydrophilic resin (A) itself photo-crosslinkable, and therefore promotes the curing of the photopolymerizable composition. Introduction of a radical-polymerizable unsaturated group into the resin (A) may be carried out, for example, by copolymerizing an unsaturated monomer having a carboxyl, glycidyl or hydroxyl group in the hydrophilic resin (A), and reacting it with a glycidyl-containing unsaturated monomer (when the side chain contains a carboxyl group), a carboxyl-containing unsaturated monomer (when the side chain contains a glycidyl group), or a mono-adduct of a diisocyanate compound and a hydroxyl-containing unsaturated monomer (when the side chain contains a hydroxyl group).

The radical-polymerizable mono-unsaturated monomer used as component (B) of the photopolymerizable composition is used as a main reagent in the grafting reaction taking place on the surface of the polymeric substrate and acts to improve the adhesiveness of the surface of the polymeric substrate. For this purpose, the radical-polymerizable mono-unsaturated monomer (B) should have a relatively low molecular weight, some degree of polarity, and high radical-polymerizability.

Examples of the radical-polymerizable mono-unsaturated monomer (B) are given below.

(i) Acrylic or methacrylic acid esters;

$C_{1-6}$ alkyl esters of acrylic or methacrylic acid, such as methyl acrylate, ethyl acrylate, propyl acrylate, butyl acrylate, methyl methacrylate, ethyl methacrylate, propyl methacrylate and butyl methacrylate; and glycidyl esters of acrylic or methacrylic acid, such as glycidyl acrylate and glycidyl methacrylate.

(ii) Complexes of acrylic or methacrylic acid with organometallic compounds;

Organotitanium, organoaluminum and organozirconium compounds are the preferred organometallic compounds. Specific examples are complexes obtained by the reaction of acrylic or methacrylic acid with tetramethyl titanate, tetraethyl titanate, tetra-n-propyl titanate, tetra-i-propyl titanate, tetra-n-butyl titanate, tetra-i-butyl titanate, tetra-tert-butyl titanate, aluminum isopropiolate, aluminum sec-butylate, aluminum tert-butylate, tetramethyl zirconate, tetraethyl zirconate, tetra-i-propyl zirconate, tetra-n-butyl zirconate, etc.

(iii) Vinyl esters of aliphatic or aromatic monobasic acids;

Vinyl acetate and vinyl propionate.

(iv) Acrylonitrile and styrene:

The hydrophilic ethylenically unsaturated monomers used in the production of the hydrophilic resin (A) may also be used. Those radical polymerizable mono-unsaturated monomers which have high hydrophilicity may sometimes reduce water resistance, but this can be avoided by carefully selecting their amount, their combination with other compounds, etc.

The $C_{1-4}$ alkyl esters of acrylic acid, and complexes of acrylic acid with organotitanium compounds are preferred among the above radical-polymerizable mono-unsaturated monomeric compounds. The above radical-polymerizable mono-unsaturated monomers may be used singly or as a mixture of two or more.

The proportion of the radical-polymerizable mono-unsaturated monomer (B) in the photopolymerizable composition is desirably 15 to 90% by weight, preferably 20 to 60% by weight, per 100% by weight of the components (A), (B) and (C) combined. If the content of the component (B) is less than 15% by weight, the grafting reaction cannot be performed fully on the surface of the polymeric substrate. If, on the other hand, the content of the component (B) exceeds 90% by weight, the curing of the photopolymerizable composition is insufficient.

The triplet state sensitizer (C) to be added to the photopolymerizable composition in this invention has an energy in the triplet state of at least 50 Kcal/mole and can extract hydrogen atoms from the surface of the polymeric substrate to form active sites for grafting reaction.

Examples of the triplet state sensitizer (C) include thioxanthone and the derivatives thereof, benzophenone and the derivatives thereof, xanthone and the derivatives thereof, and acetophenone and the derivatives thereof.

The proportion of the triplet state sensitizer (C) to be added to the photopolymerizable composition is desirably 0.1 to 30% by weight, preferably 1 to 7% by weight, per 100% by weight of the components (A), (B) and (C) combined. If its proportion is less than 0.1% by weight, grafting reaction of the radical polymerizable mono-unsaturated compound (B) to the surface of the polymeric substrate scarcely takes place. If, on the other hand, the content of the sensitizer (C) exceeds 30% by weight, a termination reaction occurs frequently in the polymerization reaction to give a brittle film of the photopolymerizable composition.

In order to promote the curing of the photopolymerizable composition, a radical-cleavage type photopolymerizable initiator may be used in the composition as required. Examples of the photopolymerizable initiator are benzoyl ether, benzil compounds, azobisisobutyronitrile, disulfide compounds, a riboflavin-ascorbic acid system, a ferrous chloride-eosine system, and a benzophenone-amine system. The amount of the photopolymerizable initiator is not more than 5 parts by weight per 100 parts by weight of the components (A), (B) and (C) combined. If it is used in an amount of more than 5 parts by weight, it will undesirably hamper the grafting reaction.

Although the surface of the synthetic polymeric substrate can be modified to a practical degree by using a photopolymerizable composition consisting only of the components (A), (B) and (C), the modifying effect may be increased by optionally adding a poly-unsaturated compound represented by the following formulae (I) to (III) derived from isophorone diisocyanate, trimethylene diisocyanate and melamine and capable of being radical-polymerized even in the presence of oxygen [to be referred to hereinbelow as "radical-polymerizable polyunsaturated compound (D)"]. This compound is especially effective when the content of the hydrophilic resin (A) is small and the crosslinking reactivity of the resin (A) is slow.

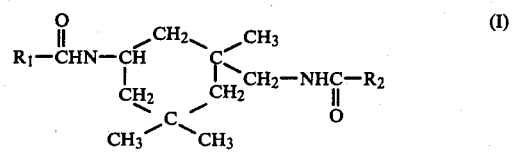

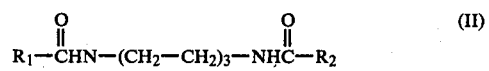

(wherein each of $R_1$ and $R_2$ represents

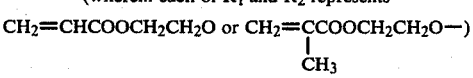

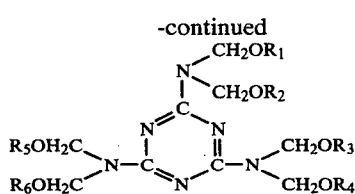

(III)

(wherein each of $R_1$ to $R_6$ represents H, —$CH_3$, $CH_2$=CHCOOCH$_2$CH$_2$O—, or $CH_2$=CCOOCH$_2$CH$_2$O—,
                                                                                          |
                                                                                          $CH_3$ and at least two of $R_1$ to $R_6$ represent the acrylic acid ester residue and/or the methacrylic acid ester residue).

The radical-polymerizable poly-unsaturated compound (D), by its own reaction in the photopolymerizable composition, prevents diffusion of oxygen to the surface of the polymeric substrate and promotes the grafting reaction of the radical-polymerizable mono-unsaturated monomer with the substrate surface. Simultaneously, by its own polymerization and crosslinking reaction, the radical-polymerizable poly-unsaturated compound (D) may form a fully cured durable film of the photopolymerizable composition.

The amount of the radical-polymerizable poly-unsaturated compound is desirably not more than 80% by weight, preferably 5 to 50% by weight, per 100% by weight of the components (A), (B), (C) and (D) combined. If the amount of the component (D) exceeds 80% by weight, the curing of the photopolymerizable composition on the surface of the polymeric substrate takes place predominantly over the grafting reaction, and the grafting reaction becomes difficult.

In order to improve the properties of the cured film of the photopolymerizable composition, it is also possible to add a polymer having at least two radical-polymerizable unsaturated groups in the molecule, such as known unsaturated epoxy resins, unsaturated acrylic resins, unsaturated urethane resins, and unsaturated polyester resins, to the photopolymerizable composition in addition to the aforesaid compounds (I) to (III).

If required, the photopolymerizable composition used in this invention may include usually employed amounts of solvents, thickeners, pigments, dyes, various additives, etc.

The resulting liquid photopolymerizable composition is coated on the surface of the polymeric substrate. The thickness of the coated dry film is 0.1 to 100 microns, preferably 0.5 to 10 microns. Coating may be performed by known methods such as spray coating, dip coating, brush coating and roll coating.

The coated substrate surface is then exposed to actinic rays to perform the grafting reaction of the radical-polymerizable mono-unsaturated monomer at the surface of the polymeric substrate and the curing of the photopolymerizable composition. The time required for irradiation of the actinic rays is 5 seconds to 10 minutes. Irradiation of the actinic rays can be performed more effectively in an atmosphere of an inert gas such as nitrogen gas.

The sources for actinic rays may be those which can generate actinic rays having a wavelength in the range of 200 to 500 nm. Examples include fluorescent lamps, low-pressure mercury lamps, high-pressure mercury lamps, superhigh-pressure mercury lamps, hydrogen discharge lamps, metal halide lamps, xenon lamps, carbon arc lamps, tungsten glow lamps, and sunlight.

The film of the photopolymerizable composition formed on the substrate by the method of this invention adheres firmly to the substrate by the grafting reaction. As a result of crosslinking, the coated film has excellent properties and durability, and the surface of the film has polarity suitable for adhesion. Accordingly, the coated film has a high level of adhesion to a broad range of adhesives and paints, and permits practical coating of the polymeric substrate and practical bonding of it to another substrate while maintaining the quality of the product over a long period of time. It is particularly noteworthy that the method of this invention makes possible coating and bonding of polyolefinic resins which have been impossible heretofore, and thus enables the polyolefin resins to be used in a wider range of applications.

The following Examples illustrate the present invention more specifically. All parts and percentages in these examples are by weight.

SYNTHESIS OF A HYDROPHILIC RESIN

SYNTHESIS EXAMPLE 1

A 1-liter four-necked flask equipped with a thermometer, a stirrer, a condenser, a dropping funnel and a gas introducing tube was charged with 250 g of toluene, and it was heated to 90° C. A solution consisting of 125 g of methyl methacrylate, 25 g of glycidyl methacrylate, 100 g of N-vinylpyrrolidone and 25 g of 2,2'-azobisisobutyronitrile was added dropwise to the hot solvent in the flask with stirring for 3 hours while blowing nitrogen gas thereinto. Then, 0.5 g of 2,2'-azobis-2,4-dimethylvaleronitrile was added, and reacted under the same conditions for 2 hours to give a hydrophilic resin (a).

SYNTHESIS EXAMPLE 2

The same flask as used in Synthesis Example 1 was charged with 200 g of the hydrophilic resin (a) prepared in Synthesis Example 1, and it was heated to 110° C. Then, 8 g of acrylic acid, 0.2 g of hydroquinone and 0.3 g of triethyl ammonium bromide was added. With stirring, the reaction was performed at 110° C. for 2 hours while blowing air into the flask, thereby giving a hydrophilic resin (b).

SYNTHESIS OF A RADICAL-POLYMERIZABLE MONO-UNSATURATED MONOMERIC COMPOUND

SYNTHESIS EXAMPLE 3

The same 1-liter four-necked flask as used in Synthesis Example 1 was charged with 100 g of a decamer of tetra-i-propyl titanate (A-10, a tradename for a product of Nippon Soda Co., Ltd.) and 200 g of toluene. They were heated to 60° C., and 200 g of acrylic acid was added dropwise to the heated solution with stirring while blowing nitrogen gas into the flask. Then, the reaction was performed at the same temperature for 30 minutes with stirring to give a radical-polymerizable mono-unsaturated monomeric compound (a).

SYNTHESIS OF A RADICAL-POLYMERIZABLE POLY-UNSATURATED COMPOUND

SYNTHESIS EXAMPLE 4

A 5-liter four-necked flask equipped with a thermometer, an air blowing tube, a fractional distillation tube and a stirrer was charged with 780 g of hexamethoxymethylolmelamine, 928 g of 2-hydroxyethyl acrylate, 1.5 g of 35% hydrochloric acid, 1 g of hydroquinone and 300 g of cyclohexane. With stirring, cyclohexane was refluxed at 120° C. while blowing air into the flask, thereby performing methanol-eliminating reaction for 4 hours. After the reaction, the cyclohexanone was removed to give a radical-polymerizable poly-unsaturated compound (a).

SYNTHESIS EXAMPLE 5

The same flask as used in Synthesis Example 4 was charged with 1560 g of hexamethoxymethylolmelamine, 464 g of 2-hydroxyethyl acrylate, 5 g of 36% hydrochloric acid, 2 g of hydroquinone and 350 g of cyclohexanone, and they were reacted under the same conditions as in Synthesis Example 4 to give a radical-polymerizable poly-unsaturated compound (b).

SYNTHESIS EXAMPLE 6

The same flask as used in Synthesis Example 1 was charged with 230 g of isophorone diisocyanate, 136 g of 2-hydroxyethyl acrylate, and 30 mg of dibutyltin deacetate, and they were reacted at 60° C. for 4 hours with stirring while blowing air into the flask, thereby giving a radical-polymerizable poly-unsaturated compound (c).

EXAMPLES 1 TO 9

In each run, a photopolymerizable composition obtained by the recipe shown in Table 1 was coated on a polypropylene plate, 2×100×300 mm in size, (made by Nippon Test Panel Co., Ltd.) by a bar coater so that the thickness of the coated dry film was 2 to 3 microns. Light was irradiated for 3 minutes onto the coated surface from a 3KW water-cooled superhigh-pressure mercury lamp disposed 30 cm away from the polypropylene plate, thereby modifying the surface of the polypropylene plate. The results are shown in Table 2. As is seen from Table 2, the cured film layer of the photopolymerizable composition adhered closely to the polypropylene plate. When a two-package urethane paint (Retan PG-60, a tradename for a product of Kansai Paint Co., Ltd.) was coated on the coated surface of the polypropylene plate, the product had highly practical adhesion characteristics.

COMPARATIVE EXAMPLE 1

A photopolymerizable composition was prepared by mixing 100 parts of an epoxy acrylic-type ultraviolet-curable resin solution (Epoxy F-990, a tradename for a product of Showa Polymer Co., Ltd.), 2 parts of polypropylene glycol dimethacrylate (NK ESTER P-PG, a tradename for a product of Shin Nakamura Chemical Co., Ltd.), 4 parts of a 25% ethyl acetate solution of benzoin methyl ether and 4 parts of a 25% ethyl acetate solution of benzophenone.

Using the resulting photopolymerizable composition, the same test as in Example 1 was conducted. The results are shown in Table 2. No improvement was noted in the adhesion of a polypropylene plate to a two-package urethane paint.

TABLE 1

Formulation recipe of a photopolymerizable composition (parts)

| Example | Hydrophilic resin | Radical-polymerizable mono-unsaturated monomer | Radical-polymerizable poly-unsaturated compound | Solvent | Triplet state sensitizer |
|---|---|---|---|---|---|
| 1 | K-15 (*1) (30) | (a) (62) | — | — | Benzophenone (8) |
| 2 | (b) (50) | Ethyl acrylate (50) | — | — | Acetophenone (5) |
| 3 | PK-30 (*2) (2) | Methyl acrylate (55) | (c) (6) | Methanol (30) | Thioxanthone (7) |
| 4 | PK-30 (9) | Methyl methacrylate (10) | (b) (45) | Methanol (35) | Benzophenone (1) |
| 5 | K-15 (20) | i-Butyl acrylate (16) | (a) (4) | Acetone (50) | Acetophenone (5) |
| 6 | (a) (32) | Ethyl acrylate (32) | (a) (4) | Acetone (24) | Benzophenone (4) |
| 7 | (a) (24) | (a) (20) | (b) (22) | Acetone (30) | Benzophenone (4) |
| 8 | Polymer B (*3) (10) | Methyl acrylate (35) | (a) (8) | Acetone/methanol (24/20) | Benzophenone (3) |
| 9 | Polymer B (30) | i-Butyl acrylate (12) | (c) (6) | Acetone/methanol (30/20) | Thioxanthone (20) |

TABLE 2

Properties of the coated film (adhesiveness)

| | | Properties after coating the two-package urethane paint | | |
|---|---|---|---|---|
| Example | Adhesiveness of the photopolymerizable composition (*4) | Adhesion strength (kg/cm²) (*5) | Primary adhesiveness (*6) | Secondary adhesiveness (*7) |
| 1 | 100/100 | 85 | 100/100 | 80/100 |
| 2 | 100/100 | 95 | 100/100 | 100/100 |
| 3 | 100/100 | 106 | 100/100 | 100/100 |
| 4 | 100/100 | 120 | 100/100 | 100/100 |
| 5 | 100/100 | 140 | 100/100 | 100/100 |
| 6 | 100/100 | 142 | 100/100 | 100/100 |
| 7 | 100/100 | 135 | 100/100 | 95/100 |
| 8 | 100/100 | 126 | 100/100 | 100/100 |
| 9 | 100/100 | 115 | 100/100 | 100/100 |
| Comparative Example 1 | 5/100 | 12 | 12/100 | 0/100 |

Note to Tables 1 and 2
(1) Polyvinylpyrrolidone (molecular weight 40,000, a product of Wako Pure Chemical Co., Ltd.)
(2) Vinyl acetate/acrylic acid copolymer (PK-30, a tradename for a product of Nippon Shellac Co., Ltd.)
(3) N—vinylpyrrolidone/vinyl acetate copolymer (60:40, a product of Aldrich Co.)
(4) The coated surface was cut crosswise and lengthwise at intervals of 1 mm to provide 100 squares. An adhesive cellophane tape was applied to the cut surface, and peeled at right angles to the coated surface. The number of squares remaining unpeeled was counted.
(5) A stainless steel terminal having a diameter of 5 mm was attached to the coated surface by an epoxy resin adhesive, and its adhesion strength was measured by a Schopper tensile tester.
(6) Peel test by an adhesive cellophane tape after coating the two-package urethane paint.
(7) Peel test by an adhesive cellophane tape after dipping in warm water at 50° C. for 200 hours.

What we claim is:
1. A method of forming an adhesive layer on the surface of a synthetic polymeric substrate, which comprises:

coating the surface of the synthetic polymeric substrate with a photopolymerizable composition comprising:

(A) a hydrophilic resin obtained by polymerization of a polymerizable unsaturated monomer composition containing at least 10% by weight of a hydrophilic unsaturated monomer, (B) a radical-polymerizable mono-unsaturated monomer, (C) a triplet state sensitizer having a triplet state energy of at least 50 Kcal/mole, and (D) a radical-polymerizable poly-unsaturated compound selected from the group consisting of compounds of the formulae I, II and III:

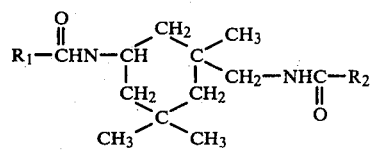 (I)

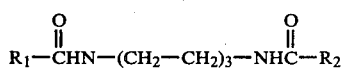 (II)

wherein, in formulae I and II, each of $R_1$ and $R_2$ represents

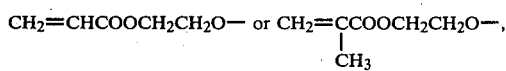

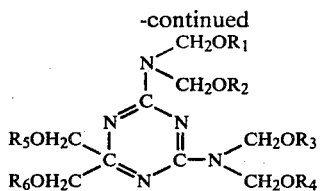 (III)

wherein, in formula III, each of $R_1$ to $R_6$ represents H, —CH$_3$,

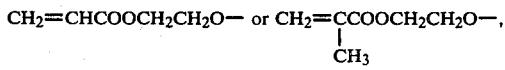

and at least two of $R_1$ to $R_6$ represent the acrylic acid ester residue and/or the methacrylic acid ester residue, and irradiating actinic rays to the coated surface of the polymeric substrate.

2. The method of claim 1 wherein the photopolymerizable composition contains 0.1 to 55% by weight of the component (A), 15 to 90% by weight of the component (B), and 0.1 to 30% by weight of the component (C) per 100% by weight of the components (A), (B) and (C) combined; and a positive amount of up to 80% by weight of the component (D) per 100% by weight of the components (A), (B), (C) and (D) combined.

3. The method of claim 1 or 2 wherein the synthetic polymeric substrate is a polyolefinic resin substrate.

4. The method of claim 1 or 2 wherein the hydrophilic unsaturated monomer used to form the hydrophilic resin (A) is selected from the group consisting of α,β-ethylenically unsaturated acids, amides or N-substituted amides of acrylic or methacrylic acid, hydroxyalkyl esters of acrylic or methacrylic acid, aminoalkyl esters of acrylic or methacrylic acid, sulfonic acid group- or phosphoric acid group-containing alkyl esters of acrylic or methacrylic acid, and N-vinyl substituted nitrogen-containing heterocyclic compounds.

5. The method of claim 1 or 2 wherein the hydrophilic resin (A) has a number average molecular weight of about 2,000 to about 1,000,000.

* * * * *